United States Patent
Lalli et al.

(10) Patent No.: US 12,240,606 B2
(45) Date of Patent: Mar. 4, 2025

(54) MONITOR STOP DEVICE

(71) Applicant: B/E Aerospace, Inc., Winston-Salem, NC (US)

(72) Inventors: Rodrigo A. Lalli, Kernersville, NC (US); Brian D. Green, King, NC (US); Andrew Mooney, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 228 days.

(21) Appl. No.: 18/106,055

(22) Filed: Feb. 6, 2023

(65) Prior Publication Data

US 2024/0262504 A1 Aug. 8, 2024

(51) Int. Cl.

| | |
|---|---|
| *B64D 11/00* | (2006.01) |
| *B60N 2/42* | (2006.01) |
| *B60N 3/00* | (2006.01) |
| *B64D 11/06* | (2006.01) |

(52) U.S. Cl.
CPC ...... *B64D 11/00151* (2014.12); *B60N 2/4221* (2013.01)

(58) Field of Classification Search
None
See application file for complete search history.

(56) References Cited

U.S. PATENT DOCUMENTS

| | | | |
|---|---|---|---|
| 9,487,157 B1 | 11/2016 | Vinton | |
| 9,669,932 B2 | 6/2017 | Murata et al. | |
| 9,695,972 B1 | 7/2017 | Jiang et al. | |
| 9,979,923 B1 | 5/2018 | Nemeth et al. | |
| 10,421,411 B2 | 9/2019 | Chang | |
| 10,513,336 B2 | 12/2019 | Peuziat | |
| 10,696,407 B2 | 6/2020 | Murray et al. | |
| 10,953,810 B2 | 3/2021 | Hernandez et al. | |
| 11,186,373 B1 | 11/2021 | Elliott et al. | |
| 2020/0148081 A1 | 5/2020 | Marais et al. | |
| 2022/0185199 A1 | 6/2022 | Syldatke | |

FOREIGN PATENT DOCUMENTS

| | | |
|---|---|---|
| CN | 106945611 B | 2/2022 |
| EP | 2888132 B1 | 10/2017 |
| EP | 3019371 B1 | 8/2018 |
| EP | 3600970 B1 | 7/2022 |
| GB | 2592230 B | 2/2022 |

OTHER PUBLICATIONS

Extended European Search Report dated Mar. 21, 2024; European Application No. 23209526.5.

*Primary Examiner* — Christopher Braniff
(74) *Attorney, Agent, or Firm* — Suiter Swantz IP (57) ABSTRACT

A monitor stop system is disclosed. The system may include a top-tilting monitor. The system may also include a monitor shroud including a tab configured to prevent the monitor from actuating to the deployed position during an HIC event. The system may further include one or more monitor stop devices. Each monitor stop device may include a spring-loaded pin assembly and a housing configured to surround at least a portion of the spring-loaded assembly. The tab may be configured to translate towards an interior surface of the seatback bezel and may be configured to cause the pin to translate through one or more monitor stop openings of the seatback bezel. Upon the pin translating, the pin may be configured to capture at least a portion of the top-tilting monitor to prevent the top-tilting monitor from actuating to the deployed position during the HIC event.

14 Claims, 11 Drawing Sheets

MONITOR STOP DEVICE

BACKGROUND

Aircraft seats often contain in-flight entertainment (IFE) devices installed within the seatback of the aircraft seat. During a head injury criterion (HIC) event, it is possible for a head of a passenger to become trapped underneath a back-seat monitor of the IFE device. Head entrapment is a major safety concern, as it would not allow a passenger to exit their row easily and may also prevent other passengers from exiting the row. In addition, in select industries the build of the seat (and any included components within the build) may be required to meet guidelines and/or standards.

SUMMARY

An aircraft seat is disclosed, in accordance with one or more embodiments of the present disclosure. The aircraft seat includes a seatback including a seatback bezel, the seatback bezel including one or more monitor stop openings. The aircraft seat includes an in-flight entertainment device coupled to a surface of the seatback bezel, the in-flight entertainment device including a top-tilting monitor configured to actuate about a top axis of the top-tilting monitor between at least a stowed position and a deployed position, the in-flight entertainment device including a monitor shroud configured couple to the top-tilting monitor to the seatback, the monitor shroud including a tab configured to prevent the top-tilting monitor from actuating to the deployed position during a head injury criterion (HIC) event. The aircraft includes one or more monitor stop devices. Each monitor stop device includes a spring-loaded pin assembly including a compressible spring and a pin, the compressible spring configured to compress along a horizontal axis of a shaft of the pin. Each monitor stop device includes a housing configured to surround at least a portion of the spring-loaded assembly, the housing configured to couple the spring-loaded pin assembly to a portion of the seatback bezel. The tab of the monitor shroud configured to translate towards an interior surface of the seatback bezel when a force is applied to the top-tilting monitor during the HIC event. Upon the tab of the monitor shroud translating towards the interior surface of the seatback bezel, the compressible spring configured to cause the pin to translate through the one or more monitor stop openings. Upon the pin translating through the one or more monitor stop openings, the pin configured to capture at least a portion of the top-tilting monitor to prevent the top-tilting monitor from actuating to the deployed position during the HIC event.

In some embodiments, the spring-loaded pin assembly may further include at least one of one or more retaining clips, one or more washers, one or more bushings, or one or more rivets.

In some embodiments, the housing may be configured to couple the spring-loaded pin assembly to the portion of the seatback bezel at a central axis of the top-tilting monitor.

In some embodiments, the housing may include one or more pin openings configured to receive at least a portion of the shaft of the pin, the pin may be configured to translate through the one or more pin openings of the housing. Upon the tab of the monitor shroud translating towards the interior surface of the seatback bezel, the compressible spring may be configured to cause the pin to translate through the one or more pin openings in the housing.

In some embodiments, the housing may be formed of sheet metal.

In some embodiments, the housing may be formed of plastic.

A monitor stop system is disclosed, in accordance with one or more embodiments of the present disclosure. The system includes a top-tilting monitor configured to actuate about a top axis of the top-tilting monitor between at least a stowed position and a deployed position. The system includes a monitor shroud including a tab configured to prevent the top-tilting monitor from actuating to the deployed position during a head injury criterion (HIC) event. The system includes one or more monitor stop devices. Each monitor stop device includes a spring-loaded pin assembly including a compressible spring and a pin, the compressible spring configured to compress along a horizontal axis of a shaft of the pin. Each monitor stop device includes a housing configured to surround at least a portion of the spring-loaded assembly, the housing configured to couple the spring-loaded pin assembly to a portion of a seatback bezel of a seat. The tab of the monitor shroud configured to translate towards an interior surface of the seatback bezel when a force is applied to the top-tilting monitor during the HIC event. Upon the tab of the monitor shroud translating towards the interior surface of the seatback bezel, the compressible spring configured to cause the pin to translate through the one or more monitor stop openings. Upon the pin translating through the one or more monitor stop openings, the pin may be configured to capture at least a portion of the top-tilting monitor to prevent the top-tilting monitor from actuating to the deployed position during the HIC event.

In some embodiments, the seat may include an aircraft seat.

In some embodiments, the aircraft seat may include the aircraft seatback including the aircraft seatback bezel and the seatback bezel including the one or more monitor stop openings.

In some embodiments, the spring-loaded pin assembly may further include at least one of one or more retaining clips, one or more washers, one or more bushings, or one or more rivets.

In some embodiments, the housing may be configured to couple the spring-loaded pin assembly to the portion of the seatback bezel at a central axis of the top-tilting monitor.

In some embodiments, the housing may include one or more pin openings configured to receive at least a portion of the shaft of the pin, the pin may be configured to translate through the one or more pin openings of the housing. Upon the tab of the monitor shroud translating towards the interior surface of the seatback bezel, the compressible spring may be configured to cause the pin to translate through the one or more pin openings in the housing.

In some embodiments, the housing may be formed of sheet metal.

In some embodiments, the housing may be formed of plastic.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5E in general illustrate a monitor stop device, in accordance with one or more embodiments of the disclosure.

Aircraft seats often contain in-flight entertainment (IFE) devices installed within the seatback of the aircraft seat. During a head injury criterion (HIC) event, it is possible for an aircraft training device (ATD) to be trapped underneath the top-mounted back-seat monitor. More particularly, a head of a passenger may become trapped underneath a back-seat monitor, where the monitor is a top-mounted monitor that hinges from the top. Head entrapment is a major safety concern, as it would not allow a passenger to exit their row easily and may also prevent other passengers from exiting the row.

Conventional devices often include components (e.g., support pins, brackets, etc.) that are apart of the monitor assembly (e.g., coupled to the monitor itself). Such components add to the weight of the monitor assembly and increase the mass that a passenger's head is hitting, thereby increasing the HIC score. Further, in the event of a false deployment, it may be difficult to reset the device. Additionally, conventional devices are often one-time use devices.

In addition, in select industries the build of the seat (and any included components within the build) may be required to meet guidelines and/or standards. For example, aircraft seats may be required to meet aviation guidelines and/or standards. For instance, the select aircraft seats may need to be configured in accordance with aviation guidelines and/or standards put forth by, but not limited to, the Federal Aviation Administration (FAA), the European Aviation Safety Agency (EASA), or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be desirable to provide a monitor stop device for a top-mounted tilt monitor (i.e., a monitor that rotates about the top axis of the monitor). The monitor stop device should prevent a head of a passenger from becoming trapped by the back of the top-mounted tilt monitor. For example, the monitor stop device should prevent the top-mounted tilt monitor from deploying when load is applied to the monitor, such that the head of the passenger does not become entrapped. The monitor stop device should be a multi-use device that may be reset after the HIC event. The monitor stop device should not be visible to a passenger prior to an HIC event. The monitor stop device should not add additional weight to the monitor itself, such that the mass hitting a passenger's head is not increased. The monitor stop device should be configured in accordance with aviation guidelines and/or standards.

Referring in general to FIGS. 1-5E, one or more monitor stop devices may be integrated within an aircraft seat 100 installed within an aircraft cabin. For example, the aircraft seat 100 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

Figure 1:
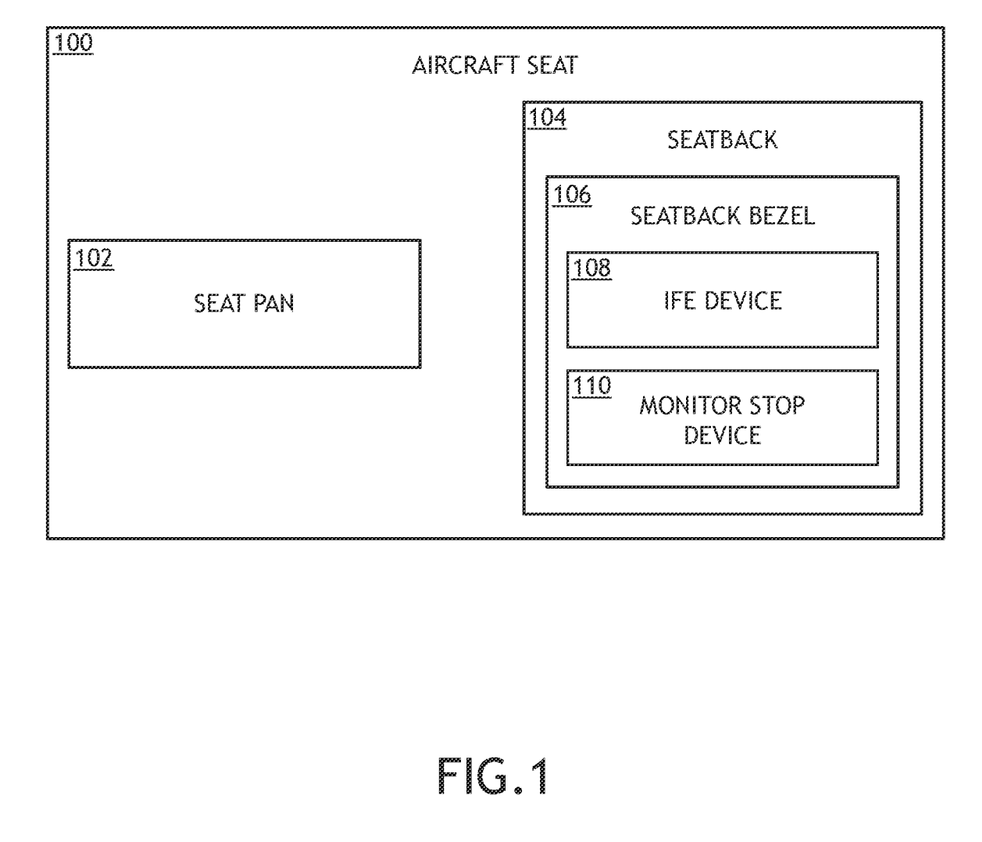
FIG. 1 illustrates a simplified block diagram of an aircraft seat including a monitor stop device, in accordance with one or more embodiments of the present disclosure.

The aircraft seat 100 may be rotatable about an axis (e.g., swivelable). The aircraft seat 100 may be fully positionable between the outer limits of motion as defined by the moveable components of the aircraft seat 100. Where the aircraft seat 100 is installed within a passenger compartment, the aircraft seat 100 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 100 may be actuatable (e.g., translatable and/or rotatable) from the TTL position to a non-TTL position, and/or vice versa. Further, it is noted the aircraft seat 100 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 100 may be translatable (e.g., trackable or slidable). The aircraft seat 100 may be rotatable about an axis cross-wise through the aircraft seat 100 into a position including, but not limited to, the upright or raised position, one or more lounge or reclined positions, and a lie-flat or bed position. For example, the aircraft seat 100 may transition directly between the upright or raised position and the lie-flat or bed position. By way of another example, it is noted the aircraft seat 100 may transition through one or more lounge or reclined positions between the upright or raised position and the lie-flat or bed position. By way of another example, the aircraft seat 100 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 100 may include a seat pan 102 and a seatback 104. The aircraft seat 100 may further include one or more arms. The aircraft seat 100 may be coupled to a base. The base may be couplable to a floor of an aircraft cabin.

The seatback 104 may include a headrest. For example, the headrest may be integrated within the seatback 104. By way of another example, the headrest may be a separate component coupled to (or inserted into) the seatback 104. For instance, the headrest may be movable relative to the seatback frame of the aircraft seat 100 (e.g., adjustable, removable, or the like).

The seatback 102 may include a seatback bezel 106 configured to couple to a portion of a seatback frame. The seatback bezel 106 may include, but is not required to include, a cavity for storing a food tray, a storage compartment, a charging port, a headphone jack, and the like. The cavity may be defined by one or more surfaces of the seatback bezel 106. For example, the cavity may be configured to store a food tray during TTL or non-TTL stages of flight. For instance, the seatback bezel 106 may include a latch configured to securely store the food tray in the stowed position within the cavity during TTL or non-TTL stages of flight.

The seatback bezel 106 may further include an in-flight entertainment (IFE) device 108 coupled to a surface of the seatback bezel 106 (e.g., in an actuatable position). For example, the seatback bezel 106 may include a top-tilting IFE device configured to rotate/actuate about a top axis, as will be discussed further herein.

The seatback bezel 106 may further include one or more monitor stop devices 110. For example, the one or more monitor stop devices 110 may be coupled to the seatback bezel 106 and arranged proximate to a portion of the IFE device 108, such that the one or more monitor stop devices 110 may capture at least portion of the IFE device 108 during deployment to prevent possible head entrapment, as will be discussed further herein.

Figure 2:
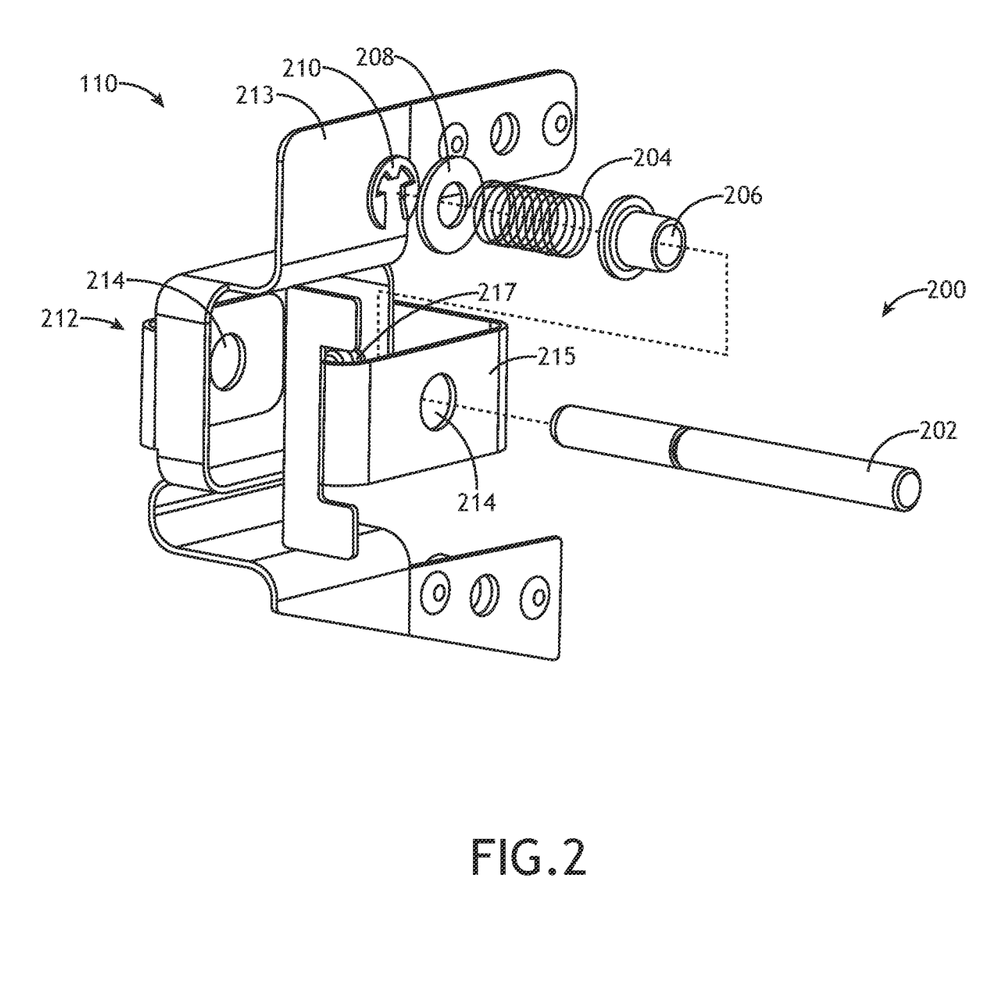
FIG. 2 illustrates an exploded view of the monitor stop device, in accordance with one or more embodiments of the present disclosure.
Figure 3A:
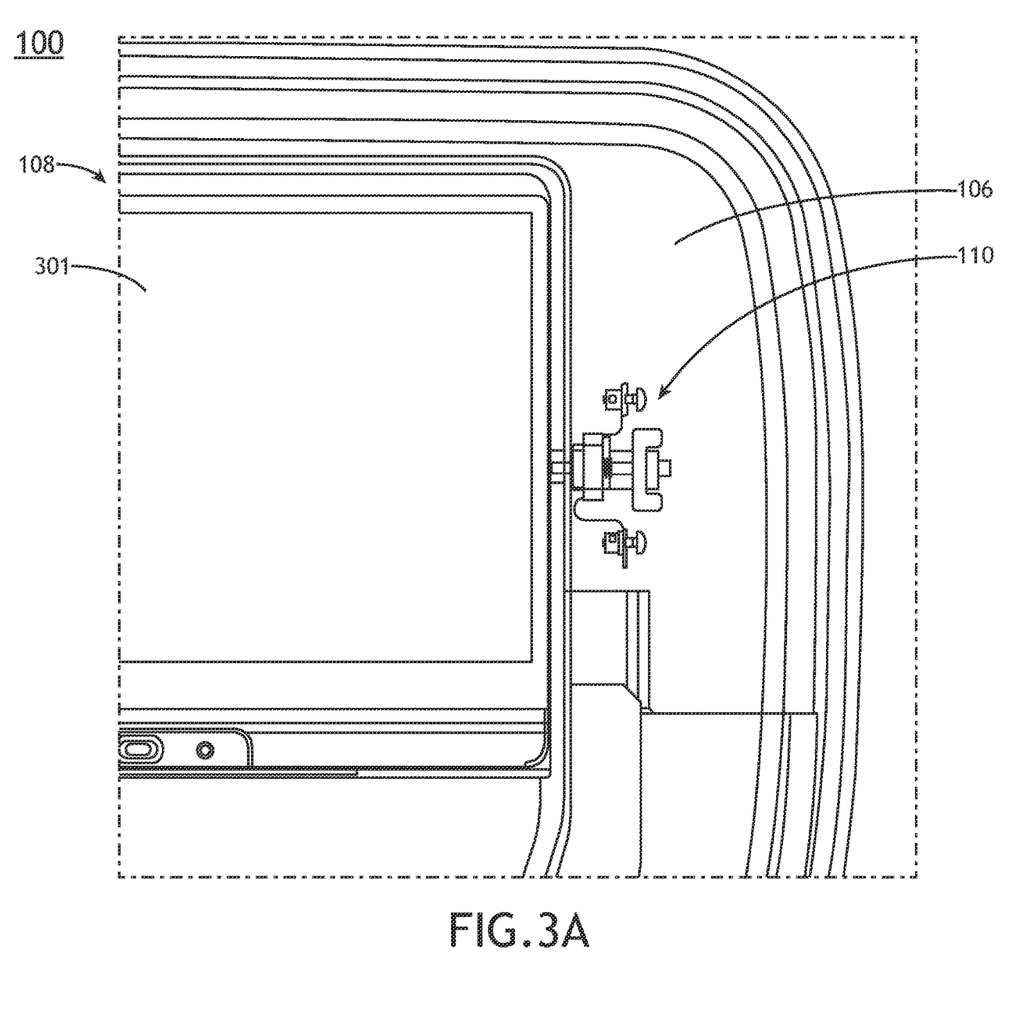
FIG. 3A illustrates a schematic view of a seatback bezel of the aircraft seat including the monitor stop device, in accordance with one or more embodiments of the present disclosure.
Figure 3B:
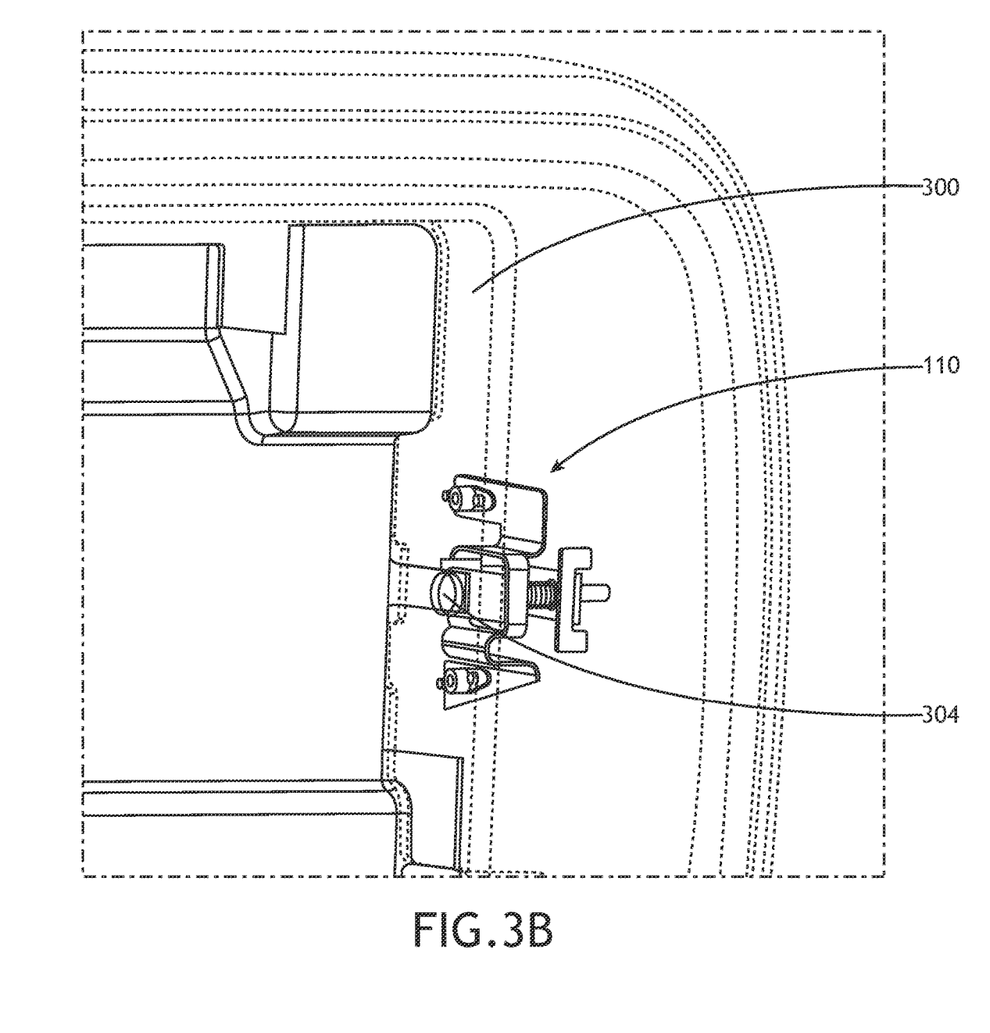
FIG. 3B illustrates a schematic view of the seatback bezel of the aircraft seat including the monitor stop device, in accordance with one or more embodiments of the present disclosure.
Figure 3C:
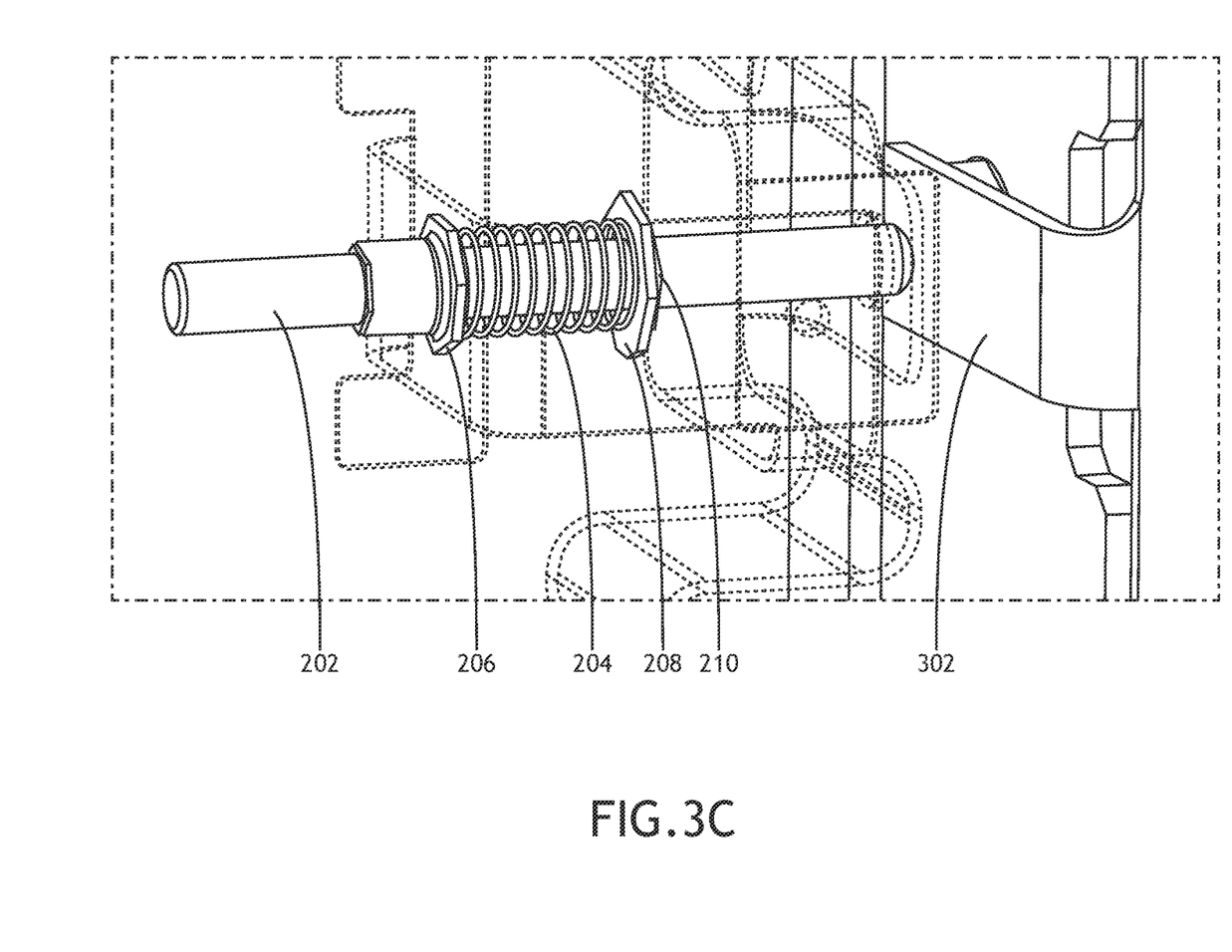
FIG. 3C illustrates a schematic view of the monitor stop device coupled to the seatback bezel of the aircraft seat, in accordance with one or more embodiments of the present disclosure.

FIG. 2 illustrates an exploded view of the monitor stop device 110, in accordance with one or more embodiments of the present disclosure. FIGS. 3A-3C illustrate simplified schematics of the monitor stop device 110 coupled to the seatback bezel 106, in accordance with one or more embodiments of the present disclosure.

Referring to FIG. 2, the monitor stop device 110 may include a spring-loaded pin assembly 200. The spring-loaded pin assembly 200 may include, but is not limited to, a pin 202, a spring 204, a bushing 206 (or sleeve bearing), a washer 208, a retaining clip 210, and the like.

The spring 204 of the spring-loaded pin assembly 200 may be configured to couple to a shaft of the pin 202 via at least one of the bushing 206, the washer 208, or the retaining clip 210. For example, as shown in FIG. 3C, the bushing 206 may be configured to secure a first end of the spring 204 to a first end of the shaft of the pin 202 and the washer 208 and retaining clip 210 may secure a second send of the spring 204 to a second end of the shift of the pin 202. In this regard, the spring 204 may be configured to compress along a horizontal axis of the pin shaft between the first end and the second end, and vice versa, when a force is applied to the pin 202.

The monitor stop device 110 may include a housing 212 configured to house (or surround) one or more components of the spring-loaded pin assembly 200. For example, as shown in FIGS. 3A-3C, the housing 212 may be configured to house (or surround) at least a portion of the pin 202 and the spring 204.

The housing 212 may be formed of a single piece or a plurality of pieces coupled together. For example, as shown in FIG. 2, the housing 212 may include a first portion 213 coupled to a second portion 215 via a fastener 217.

The housing 212 may be formed of any flexible material suitable for housing/surrounding one or more components of the spring-loaded pin assembly 200 without adding too much weight to the aircraft seat 100. For example, the housing 212 may be formed of sheet metal. By way of another example, the housing 212 may be formed of an injection molded material. For instance, the housing 212 may be formed of plastic.

The housing 212 may include one or more pin openings 214 configured to receive a least portion of a shaft of the pin 202. For example, the pin 202 may translate through the one or more pin openings 214 of the housing 212. For instance, the spring 204 may be configured to compress when a force is applied to the monitor to cause the pin 202 to translate through the one or more pin openings 214 of the housing 212.

Referring to FIGS. 3A-3C, the housing 212 may be configured to couple to the seatback bezel 106 via one or more fasteners. For example, the housing 212 may be configured to couple the spring-loaded pin assembly 200 to the seatback bezel 106. For instance, as shown in FIG. 3A, the housing 212 and the spring-loaded pin assembly 200 may be configured to couple to the seatback bezel 106 at a center axis of the monitor, such that the lever of the spring-loaded pin assembly 200 is shorter to allow the spring-loaded pin assembly 200 to deploy quickly to capture the monitor and prevent head entrapment.

The IFE device 108 may include a monitor shroud 300 configured to couple a monitor 301 to the seatback bezel 106 of the seatback 104.

The monitor 301 may include a top-tilting monitor 301 configured to rotate/tilt about a top axis of the monitor. It is noted that the monitor stop device 110 may be used with any suitable top-tilting monitor 301. FIGS. 3A-3C are provided merely for illustrative purposes and shall not be construed as limiting the scope of the present disclosure.

Referring to FIG. 3C, the monitor shroud 300 may include a tab 302. The tab 302 may be configured to translate to allow the pin 202 of the spring-loaded pin assembly 200 to translate through an opening 304 in the seatback bezel 106. For instance, when force is applied to the monitor 301, the force may cause the tab 302 to translate towards the seatback 104 (in the same direction as the applied force) such that the pin 202 may deploy through the opening 304 and capture the monitor 301 when the monitor 301 swings out towards the passenger (in the opposite direction of the applied force).

It is noted that FIGS. 2-3C are provided merely for illustrative purposes and shall not be construed as limiting the scope of the present disclosure. The spring-loaded pin assembly 200 may include any type of spring, pin, and/or fastener/bearing suitable for preventing the monitor from deploying. The housing 212 may be any shape, size, or configuration suitable for surrounding the spring-loaded pin assembly 200 and coupling the spring-loaded pin assembly 200 to the seatback bezel 106 of the aircraft seat 100.

Figure 4:
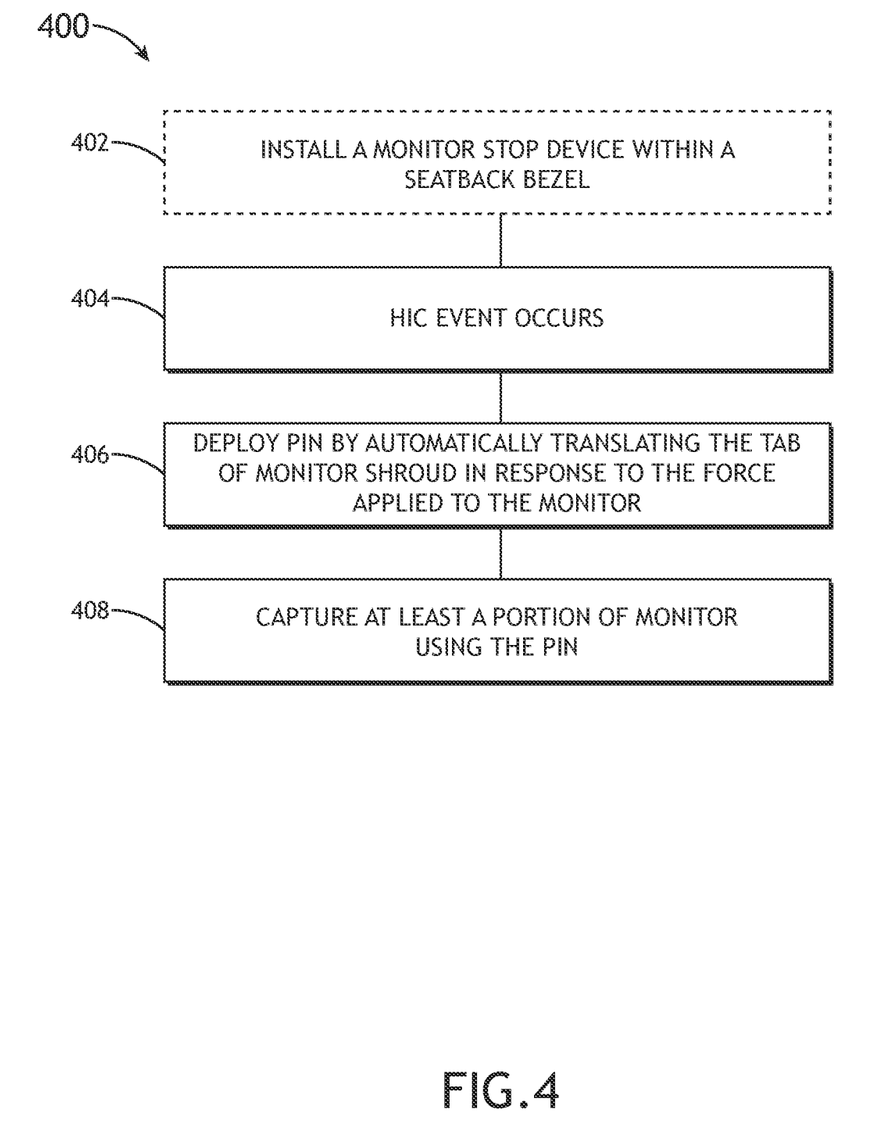
FIG. 4 illustrates a flowchart depicting a method or process for deploy of the pin of the monitor stop device, in accordance with one or more embodiments of the present disclosure.

FIG. 4 illustrates a flowchart depicting a method of process 400 for deployment of the pin 202 of the monitor stop device 110 after a load has been applied to the aircraft seat 100, in accordance with one or more embodiments of the present disclosure. FIGS. 5A-5E illustrate a conceptual flow diagram of the method or process 400 for deployment of the pin 202 of the monitor stop device 110, in accordance with one or more embodiments of the present disclosure.

Figure 5A:
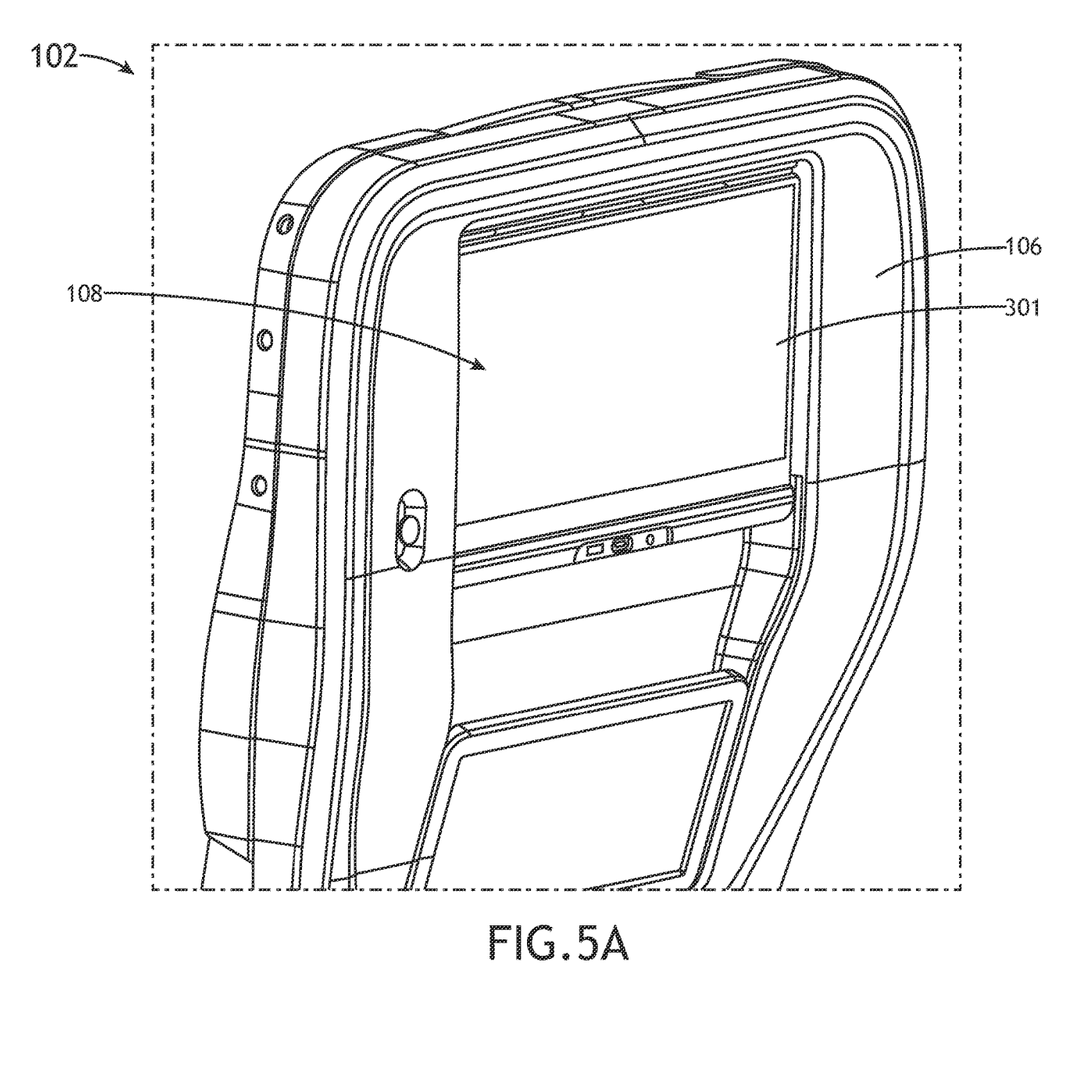
FIG. 5A illustrates a schematic view of the seatback bezel of the aircraft seat including the monitor stop device prior to a load event, in accordance with one or more embodiments of the present disclosure.

In a step 402, the monitor stop device 110 may be installed within a seatback bezel 106 of the aircraft seat 100 and positioned proximate to a top-tilting monitor 301. When installed, the monitor stop device 110 may be hidden from the passenger, as shown in FIG. 5A.

Figure 5B:
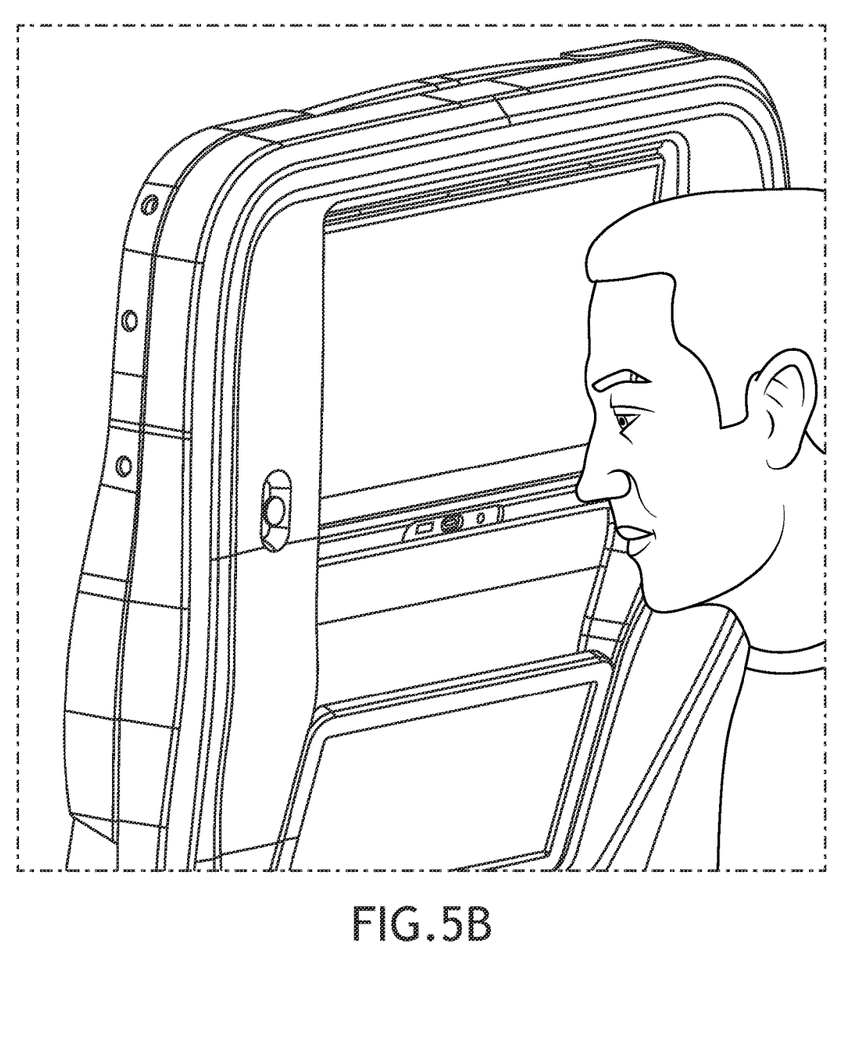
FIG. 5B illustrates a schematic view of the seatback bezel of the aircraft seat including the monitor stop device during the load event, in accordance with one or more embodiments of the present disclosure.
Figure 5C:
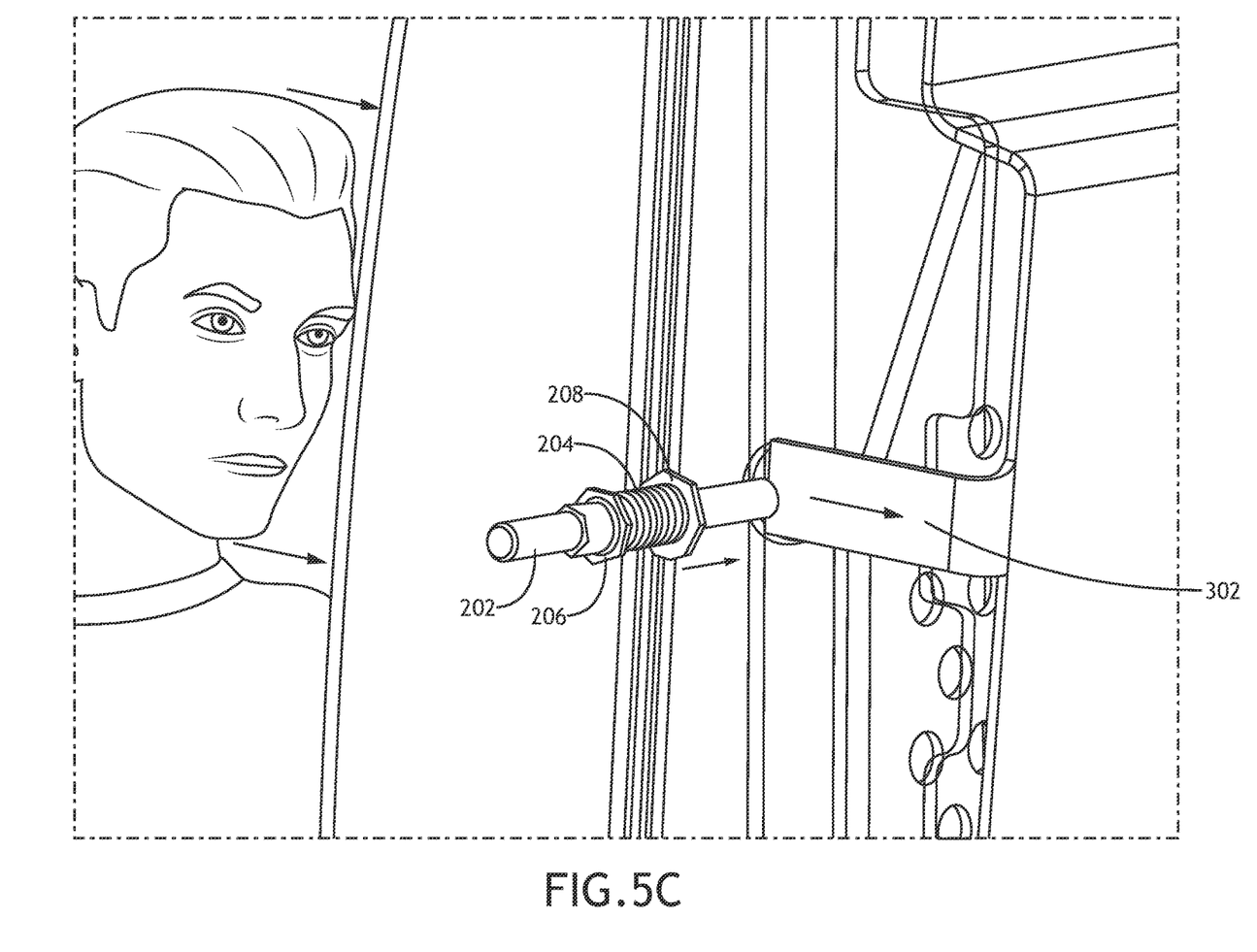
FIG. 5C illustrates a schematic view of the seatback bezel of the aircraft seat including the monitor stop device during the load event, in accordance with one or more embodiments of the present disclosure.
Figure 5D:
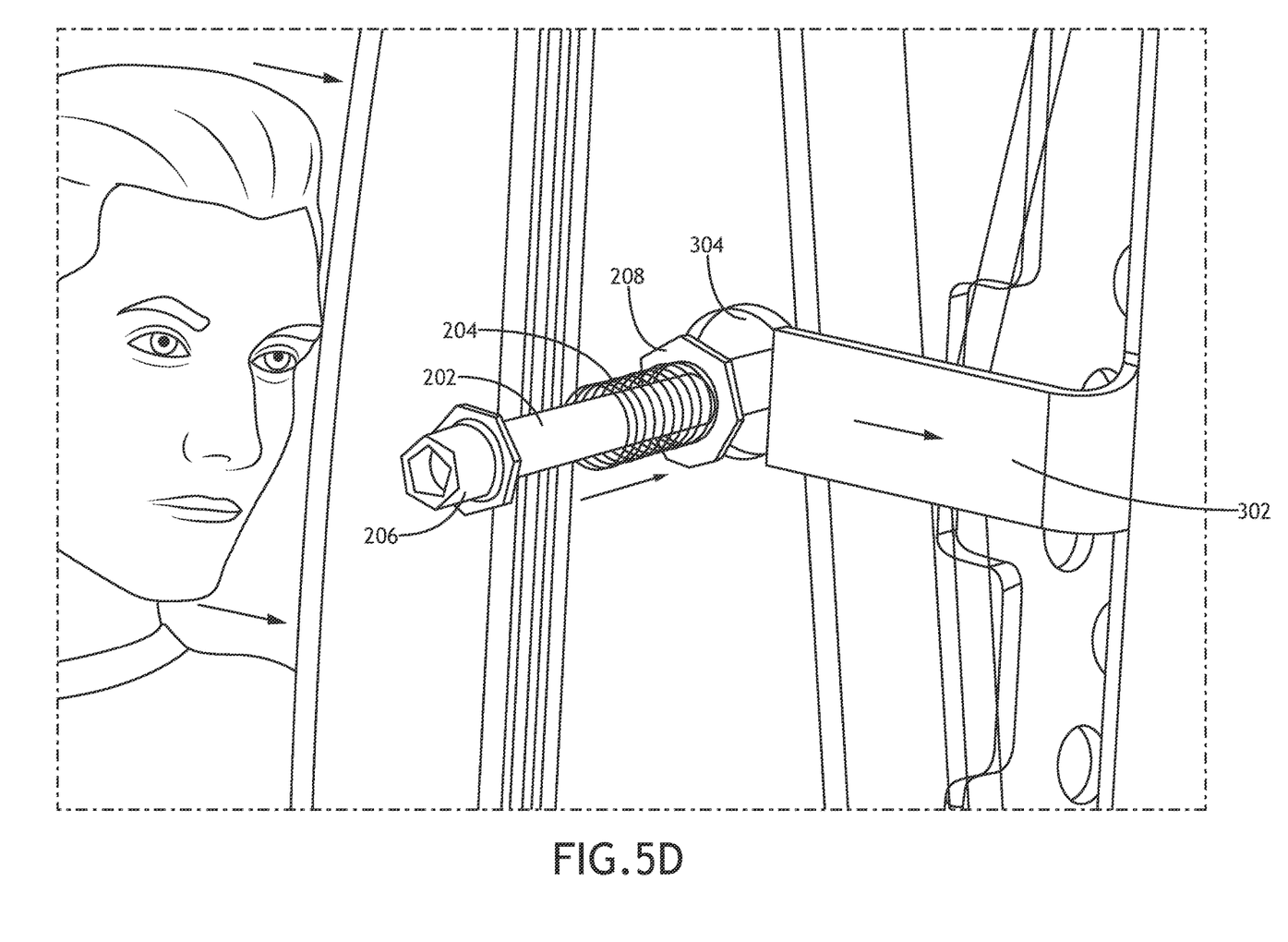
FIG. 5D illustrates a schematic view of the seatback bezel of the aircraft seat including the monitor stop device during after the load event, in accordance with one or more embodiments of the present disclosure.

In a step 404, during an HIC event, force may applied to the monitor. For example, as shown in FIGS. 5B-5D, a head of a user may push in the monitor 301 (towards the monitor shroud 300) during an HIC event. For instance, as shown in FIGS. 5B-5D, during an HIC event, the head of the user may propel in the fore direction and may push the monitor 301 in the fore direction (towards the monitor shroud 300).

In a step 406, the monitor 301 may translate the monitor shroud 300 (or monitor closeout shroud 300) to cause the tab 302 of the monitor shroud 300 to translate to allow the pin 202 to deploy. For example, as shown in FIGS. 5C-5D, the tab 302 may be configured to translate to allow the pin 202 of the spring-loaded pin assembly 200 to translate through an opening 304 in the seatback bezel 106. For instance, when force is applied to the monitor 301, the force may cause the tab 302 to translate towards the seatback 104 (in the same direction as the applied force) such that the pin 202 may deploy through the opening 304.

Figure 5E:
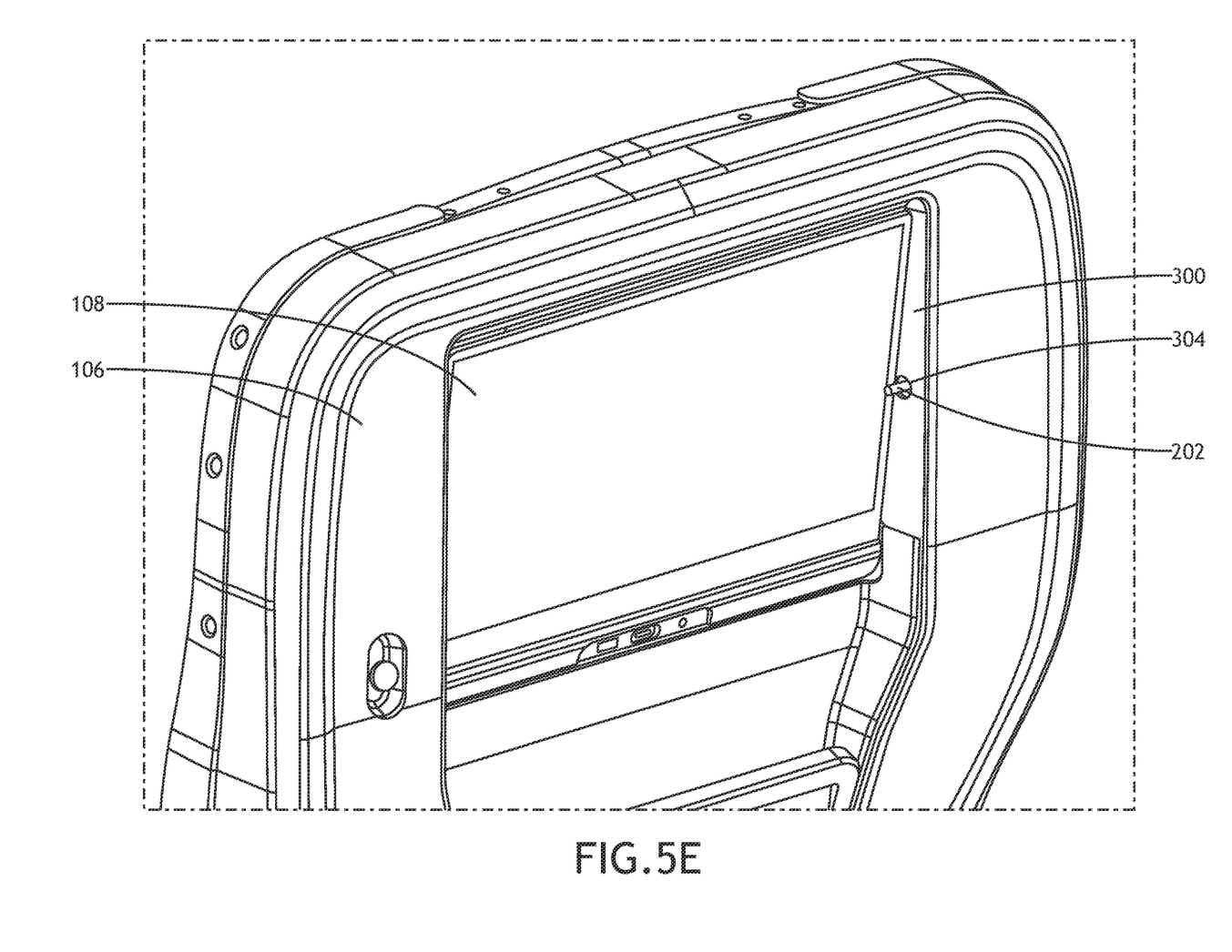
FIG. 5E illustrates a schematic view of the seatback bezel of the aircraft seat including the monitor stop device after the load event, in accordance with one or more embodiments of the present disclosure.

In a step 408, the pin 202 may capture at least a portion of the monitor 301 to prevent the monitor 301 from fully deploying. For example, as shown in FIG. 5E, once the pin 202 is deployed (in step 406), the pin 202 may be configured to capture the monitor 301 when the monitor 301 swings out towards the passenger (in the opposite direction of the applied force) to prevent the monitor 301 from fully deploying and causing head entrapment.

It is noted the method or process 400 is not limited to the steps and/or sub-steps provided. The method or process 400 may include more or fewer steps and/or sub-steps. In addition, the method or process 400 may perform the steps and/or sub-steps simultaneously. Further, the method or process 400 may perform the steps and/or sub-steps sequentially, including in the order provided or an order other than provided. Therefore, the above description should not be interpreted as a limitation on the scope of the disclosure but merely an illustration.

It is noted the monitor stop device 110 may be configured to work with any aircraft seat 100 and/or any set of components in the aircraft seat 100. For example, the monitor stop device 110 may be configured to take into account any changes in shape/size of the components of the aircraft seat 100 (e.g., monitor, seatback bezel, and the like).

Although embodiments of the disclosure illustrate the monitor stop device 110 integrated within the aircraft seat 100, it is noted, however, that the monitor stop device 110 and/or components of the monitor stop device 110 are not limited to the aviation environment and/or the aircraft components within the aviation environment. For example, the monitor stop device 110 and/or components of the monitor stop device 110 may be configured for any type of vehicle known in the art. For instance, the vehicle may be any air, space, land, or water-based personal equipment or vehicle;

any air, space, land, or water-based commercial equipment or vehicle; any air, space, land, or water-based military equipment or vehicle known in the art. By way of another example, the monitor stop device 110 and/or components of the monitor stop device 110 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, the aircraft seat comprising:
   a seatback including a seatback bezel, the seatback bezel including one or more monitor stop openings;
   an in-flight entertainment device coupled to a surface of the seatback bezel, the in-flight entertainment device including a top-tilting monitor configured to actuate about a top axis of the top-tilting monitor between at least a stowed position and a deployed position, the in-flight entertainment device including a monitor shroud configured to couple the top-tilting monitor to the seatback, the monitor shroud including a tab configured to prevent the top-tilting monitor from actuating to the deployed position during a head injury criterion (HIC) event; and
   one or more monitor stop devices, each monitor stop device comprising:
      a spring-loaded pin assembly including a compressible spring and a pin, the compressible spring configured to compress along a horizontal axis of a shaft of the pin; and
      a housing configured to surround at least a portion of the spring-loaded assembly, the housing configured to couple the spring-loaded pin assembly to a portion of the seatback bezel;
   the tab of the monitor shroud configured to translate towards an interior surface of the seatback bezel when a force is applied to the top-tilting monitor during the HIC event,
   upon the tab of the monitor shroud translating towards the interior surface of the seatback bezel, the compressible spring configured to cause the pin to translate through the one or more monitor stop openings,
   upon the pin translating through the one or more monitor stop openings, the pin configured to capture at least a portion of the top-tilting monitor to prevent the top-tilting monitor from actuating to the deployed position during the HIC event.

2. The aircraft seat of claim 1, wherein the spring-loaded pin assembly further comprises at least one of:
   one or more retaining clips, one or more washers, one or more bushings, or one or more rivets.

3. The aircraft seat of claim 1, wherein the housing is configured to couple the spring-loaded pin assembly to the portion of the seatback bezel at a central axis of the top-tilting monitor.

4. The aircraft seat of claim 1, wherein the housing includes one or more pin openings configured to receive at least a portion of the shaft of the pin, the pin configured to translate through the one or more pin openings of the housing,
   upon the tab of the monitor shroud translating towards the interior surface of the seatback bezel, the compressible spring configured to cause the pin to translate through the one or more pin openings in the housing.

5. The aircraft seat of claim 1, wherein the housing is formed of sheet metal.

6. The aircraft seat of claim 1, wherein the housing is formed of plastic.

7. A monitor stop system, the monitor stop system comprising:
   a top-tilting monitor configured to actuate about a top axis of the top-tilting monitor between at least a stowed position and a deployed position;
   a monitor shroud including a tab configured to prevent the top-tilting monitor from actuating to the deployed position during a head injury criterion (HIC) event; and
   one or more monitor stop devices, each monitor stop device comprising:
      a spring-loaded pin assembly including a compressible spring and a pin, the compressible spring configured to compress along a horizontal axis of a shaft of the pin; and
      a housing configured to surround at least a portion of the spring-loaded assembly, the housing configured to couple the spring-loaded pin assembly to a portion of a seatback bezel of a seat;
   the tab of the monitor shroud configured to translate towards an interior surface of the seatback bezel when a force is applied to the top-tilting monitor during the HIC event,
   upon the tab of the monitor shroud translating towards the interior surface of the seatback bezel, the compressible spring configured to cause the pin to translate through one or more monitor stop openings of the seatback bezel,
   upon the pin translating through the one or more monitor stop openings, the pin configured to capture at least a portion of the top-tilting monitor to prevent the top-tilting monitor from actuating to the deployed position during the HIC event.

8. The system of claim 7, wherein the seat includes an aircraft seat.

9. The system of claim 8, wherein the aircraft seat comprises:
   an aircraft seatback including the seatback bezel, the seatback bezel including the one or more monitor stop openings.

10. The system of claim 7, wherein the spring-loaded pin assembly further comprises at least one of:
    one or more retaining clips, one or more washers, one or more bushings, or one or more rivets.

11. The system of claim 7, wherein the housing is configured to couple the spring-loaded pin assembly to the portion of the seatback bezel at a central axis of the top-tilting monitor.

12. The system of claim 7, wherein the housing includes one or more pin openings configured to receive at least a portion of the shaft of the pin, the pin configured to translate through the one or more pin openings of the housing,
    upon the tab of the monitor shroud translating towards the interior surface of the seatback bezel, the compressible spring configured to cause the pin to translate through the one or more pin openings in the housing.

13. The system of claim 7, wherein the housing is formed of sheet metal.

14. The system of claim 7, wherein the housing is formed of plastic.

\* \* \* \* \*